(12) United States Patent
Ayuzawa et al.

(10) Patent No.: US 11,161,255 B2
(45) Date of Patent: Nov. 2, 2021

(54) ROBOT

(71) Applicant: NIDEC CORPORATION, Kyoto (JP)

(72) Inventors: Yuu Ayuzawa, Nagano (JP); Haruhiro Tsuneta, Nagano (JP); Hideyuki Odagiri, Nagano (JP); Hirokazu Watanabe, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 451 days.

(21) Appl. No.: 16/089,372

(22) PCT Filed: Mar. 9, 2017

(86) PCT No.: PCT/JP2017/009354
§ 371 (c)(1),
(2) Date: Sep. 28, 2018

(87) PCT Pub. No.: WO2017/169605
PCT Pub. Date: Oct. 5, 2017

(65) Prior Publication Data
US 2020/0298422 A1 Sep. 24, 2020

(30) Foreign Application Priority Data
Mar. 30, 2016 (JP) .............................. JP2016-067519

(51) Int. Cl.
*B25J 9/10* (2006.01)
*B25J 17/00* (2006.01)
(Continued)

(52) U.S. Cl.
CPC .............. *B25J 17/00* (2013.01); *B25J 9/0009* (2013.01); *B25J 9/046* (2013.01); *B25J 9/102* (2013.01); *B25J 9/126* (2013.01); *B25J 9/108* (2013.01)

(58) Field of Classification Search
CPC . B25J 17/025; B25J 9/146; B25J 17/00; B25J 9/0009; B25J 9/046; B25J 9/102;
(Continued)

(56) References Cited

U.S. PATENT DOCUMENTS 5,155,423 A * 10/1992 Karlen
5,293,107 A * 3/1994 Akeel
(Continued)

FOREIGN PATENT DOCUMENTS

| JP | H06155368 | 6/1994 |
| WO | 2009034789 | 3/2009 |
| WO | 2015004731 | 1/2015 |

OTHER PUBLICATIONS

"International Search Report (Form PCT/ISA/210)" of PCT/JP2017/009354, dated May 16, 2017, with English translation thereof, pp. 1-4.

*Primary Examiner* — Randell J Krug
(74) *Attorney, Agent, or Firm* — JCIPRNET

(57) ABSTRACT

Provided is a robot equipped with two joint parts attached to an end of an arm in a coupled state. For example, in a joint part of a robot, a motor and a reduction gear are housed in a case, and an output-side member having a flange is fixed to the output shaft of the reduction gear. An opening that opens in the direction orthogonal to the axial direction of the output shaft of the reduction gear is formed in the case. A planar attachment face orthogonal to the opening direction of the opening is formed in the opening. The robot is provided with a plurality of biaxial joint units comprising two joint parts. In the robot, the attachment face of the case of one joint part constituting a biaxial joint unit is fixed to the flange of the other joint part either directly or via a coupling member.

20 Claims, 8 Drawing Sheets

(51) Int. Cl.
*B25J 9/00* (2006.01)
*B25J 9/04* (2006.01)
*B25J 9/12* (2006.01)

(58) Field of Classification Search
CPC .......... B25J 9/126; B25J 9/108; B25J 9/1025; F16H 57/033; F16H 57/02; F16H 49/001
See application file for complete search history.

(56) References Cited

U.S. PATENT DOCUMENTS

| | | | |
|---|---|---|---|
| 6,329,731 B1* | 12/2001 | Arbanas | |
| 8,410,732 B2* | 4/2013 | Kassow | ............... B25J 19/0004 |
| | | | 318/372 |
| 2002/0134188 A1* | 9/2002 | Akinfiev | .................. B25J 9/106 |
| | | | 74/490.01 |
| 2013/0255426 A1 | 10/2013 | Kassow et al. | |
| 2016/0318180 A1* | 11/2016 | Miyasaka | .............. B25J 9/0018 |

* cited by examiner

ROBOT

CROSS-REFERENCE TO RELATED APPLICATION

This application is a 371 of international application of PCT application serial no. PCT/JP2017/009354, filed on Mar. 9, 2017, which claims the priority benefits of Japan application no. 2016-067519, filed on Mar. 30, 2016. The entirety of each of the above-mentioned patent applications is hereby incorporated by reference herein and made a part of this specification.

TECHNICAL FIELD

The present invention relates to a robot including a joint part and an arm.

BACKGROUND ART

In the related art, a robot including a base, a first arm coupled to the base via two joint parts, a second arm coupled to a tip side of the first arm via the two joint parts, and the two joint parts coupled to a tip side of the second arm is known (for example, refer to Patent Literature 1 (FIG. 27)). In the robot described in Patent Literature 1, the first arm and the second arm are formed in an elongated cylindrical shape. Furthermore, in this robot, the two joint parts disposed at both ends of the first arm and the second arm are coupled so that an axial direction of rotation of one of the joint parts and an axial direction of rotation of the other joint part are orthogonal to each other.

CITATION LIST

Patent Literature

Patent Literature 1
Specification of U.S. Pat. No. 8,410,732

SUMMARY OF INVENTION

Technical Problem

In a robot in which two joint parts coupled such that axial directions of rotation thereof are orthogonal to each other are attached to an end of an arm as in the robot described in Patent Literature 1, a coupling strength of the two joint parts is preferably high. Furthermore, in such a robot, it is desirable that the two joint parts be coupled with high accuracy so that an axial direction of rotation of one of the joint parts and an axial direction of rotation of the other joint part are orthogonal to each other.

Thus, an objective of the present invention is to provide a robot including two joint parts attached to an end of an arm in a coupled state in which a coupling strength of the two joint parts can be increased and the two joint parts can be coupled with high accuracy.

Solution to Problem

In order to achieve the above-described objective, a robot according to the present invention is a robot which includes a plurality of biaxial joint units constituted of two joint parts and longitudinal-shaped arm configured to couple two of the biaxial joint units, wherein each of the joint parts includes a motor, reduction gears coupled to the motor, an output-side member fixed to an output shaft of the reduction gears, and a case having the motor and the reduction gear housed therein, the motor and the reduction gear are fixed to the case, a rotating shaft of the motor and the input shaft and the output shaft of the reduction gear are disposed coaxially, an opening which opens in a direction orthogonal to an axial direction of the output shaft is formed in the case and a planar attachment face orthogonal to an opening direction of the opening is formed in the opening, the output-side member includes a flange part which is formed in an annular shape and is disposed on an outer side of the case, one of the two joint parts constituting the biaxial joint units is set to one joint part and the other thereof is set to the other joint part, the attachment face in the one joint part and the flange part in the other joint part are fixed together either directly or via a coupling member having a predetermined thickness in an axial direction of the output shaft in the other joint part so that an axial direction of the output shaft in the one joint part and the axial direction of the output shaft in the other joint part are orthogonal to each other, and the arm is attached to the joint part so that a longitudinal direction of the arm and the axial direction of the output shaft in the other joint part are orthogonal to each other.

In the robot according to the present invention, the planar attachment face of the one joint part which is one joint part in the biaxial joint unit and the flange part of the other joint part which is the other joint part are fixed together either directly or via a coupling member having a predetermined thickness in the axial direction of the output shaft in the other joint part. That is to say, in the present invention, the two joint parts constituting the biaxial joint unit are coupled using the planar attachment face and the flange part. For this reason, in the present invention, it is possible to increase a coupling strength of the two joint parts constituting the biaxial joint unit and it is possible to couple the two joint parts with high accuracy. Furthermore, since the two joint parts are coupled using the attachment face formed in the opening and the annular flange part in the present invention, it is possible to route a wiring or a piping between the two joint parts using an inner circumferential side of the flange part and the opening.

In the present invention, for example, the robot includes a support member configured to form a base end portion of the robot, a first arm and a second arm as the arm, and a base-end-side biaxial joint unit disposed between the support member and the first arm, an intermediate biaxial joint unit disposed between the first arm and the second arm, and a tip-side biaxial joint unit attached to a tip of the second arm as the biaxial joint units. In addition, in the tip-side biaxial joint unit, the tip of the second arm is fixed to the case in the other joint part and an end effector can be attached to a flange part of the one joint part. In this case, for example, it is possible to reduce the weight of the tip side of the second arm as compared with a case in which three joint parts in a coupled state are attached to the tip of the second arm and an end effector can be attached to one of the three joint parts. Therefore, it is possible to reduce the load exerted on a base end side of the robot.

In the present invention, the output-side member of the one joint part in the base-end-side biaxial joint unit may be fixed to the support member, the base end of the first arm may be fixed to the case in the other joint part of the base-end-side biaxial joint unit, the tip of the first arm may be fixed to the case in the other joint part of the intermediate biaxial joint unit, the base end of the second arm may be fixed to the flange part in the one joint part of the intermediate biaxial joint unit, the base-end-side biaxial joint unit may be rotatable relative to the support member using the axial direction of the output shaft in the one joint part of the base-end-side biaxial joint unit as an axial direction of rotation. The second arm may be rotatable using the axial direction of the output shaft in the other joint part of the intermediate biaxial joint unit as an axial direction of rotation relative to the first arm on a plane including the axial center of the output shaft in the one joint part of the base-end-side biaxial joint unit. The second arm using the longitudinal direction of the second arm as an axial direction of rotation may be rotatable relative to the intermediate biaxial joint unit. With this configuration, since the base-end-side biaxial joint unit using the axial direction of the output shaft in the one joint part of the base-end-side biaxial joint unit as an axial direction of rotation is rotatable relative to the support member, and the second arm is rotatable relative to the first arm on a plane including the axial center of the output shaft in the one joint part of the base-end-side biaxial joint unit, it is easy to control the robot.

In the present invention, the second arm may be shorter than the first arm to prevent the one joint part in the base-end-side biaxial joint unit and the other joint part in the tip-side biaxial joint unit from interfering with each other. With this configuration, it is possible to fold the robot compactly. Therefore, it is possible to reduce the packing costs and the transportation costs for the robot.

In the present invention, at least one of the base-end-side biaxial joint unit, the intermediate biaxial joint unit, and the tip-side biaxial joint unit may include the coupling member so that the axial center of the output shaft of the one joint part in the base-end-side biaxial joint unit and the axial center of the output shaft of the one joint part in the tip-side biaxial joint unit are disposed on the same straight line in a front face-to-front face posture in which the axial centers of the output shafts of the joint parts in all of the biaxial joint units are disposed on the same plane and the base-end-side biaxial joint unit and the tip-side biaxial joint unit are closest to each other.

In the present invention, for example, reduction ratios of all of the reduction gears included in all of the joint parts are equal to each other. In this case, it is easy to control the motor.

Also, in order to achieve the above objective, a robot according to the present invention is a robot which includes a first joint part, a second joint part, a third joint part, a fourth joint part, a fifth joint part, a sixth joint part, a longitudinal-shaped first arm, and a longitudinal-shaped second arm includes: a support member configured to form a base end portion of the robot, wherein each of the first joint part, the second joint part, the third joint part, the fourth joint part, the fifth joint part, and the sixth joint part includes a motor, a reduction gear coupled to the motor, an output-side member fixed to an output shaft of the reduction gear, and a case having the motor and the reduction gear housed therein, the motor and the reduction gear are fixed to the case, a rotating shaft of the motor and an input shaft and the output shaft of the reduction gear are disposed coaxially, an opening which opens in a direction orthogonal to an axial direction of the output shaft is formed in the case and a planar attachment face orthogonal to an opening direction of the opening is formed in the opening, the output-side member includes a flange part formed in an annular shape and disposed on an outer side of the case, a base-end-side biaxial joint unit is formed by fixing the attachment face in the first joint part to the flange part in the second joint part either directly or via a first coupling member having a predetermined thickness in the axial direction of the output shaft in the second joint part so that an axial direction of the output shaft in the first joint part and an axial direction of the output shaft in the second joint part are orthogonal to each other, an intermediate biaxial joint unit is formed by fixing the attachment face in the fourth joint part to the flange part in the third joint part either directly or via a second coupling member having a predetermined thickness in the axial direction of the output shaft in the third joint part so that an axial direction of the output shaft in the third joint part and an axial direction of the output shaft in the fourth joint part are orthogonal to each other, a tip-side biaxial joint unit is formed by fixing the attachment face in the sixth joint part to the flange part in the fifth joint part either directly or via a third coupling member having a predetermined thickness in the axial direction of the output shaft in the fifth joint part so that an axial direction of the output shaft in the fifth joint part and an axial direction of the output shaft in the sixth joint part are orthogonal to each other, the output-side member in the first joint part is fixed to the support member, the base-end-side biaxial joint unit and the first arm are coupled so that the axial direction of the output shaft in the second joint part and a longitudinal direction of the first arm are orthogonal to each other and a base end of the first arm is fixed to the case in the second joint part, the first arm and the intermediate biaxial joint unit are coupled so that the longitudinal direction of the first arm and the axial direction of the output shaft in the third joint part are orthogonal to each other and a tip of the first arm is fixed to the case in the third joint part, the intermediate biaxial joint unit and the second arm coupled so that the axial direction of the output shaft in the fourth joint part and a longitudinal direction of the second arm coincide with each other and a base end of the second arm is fixed to the output-side member in the fourth joint part, the second arm and the tip-side biaxial joint unit are coupled so that the longitudinal direction of the second arm and the axial direction of the output shaft in the fifth joint part are orthogonal to each other and a tip of the second arm is fixed to the case in the fifth joint part, and an end effector is able to be attached to the output-side member in the sixth joint part.

In the robot according to the present invention, the base-end-side biaxial joint unit is formed by fixing the planar attachment face in the first joint part to the flange part in the second joint part either directly or via the first coupling member, the intermediate biaxial joint unit is formed by fixing the planar attachment face in the fourth joint part to the flange part in the third joint part either directly or via the second coupling member, and the tip-side biaxial joint unit is formed by fixing the planar attachment face in the sixth joint part to the flange part in the fifth joint part either directly or via the third coupling member. That is to say, in the present invention, the two joint parts are coupled using the planar attachment face and the flange part. For this reason, in the present invention, it is possible to increase a coupling strength of the two joint parts and it is possible to couple the two joint parts with high accuracy. Furthermore, since the two joint parts are coupled using the attachment face formed in the opening and the annular flange part in the present invention, it is possible to route a wiring or a piping between the two joint parts using the inner circumferential side of the flange part and the opening.

In the present invention, the second arm may be rotatable using the axial direction of the output shaft in the third joint part as an axial direction of rotation relative to the first arm on a plane including the axial center of the output shaft in the first joint part. With this configuration, it is easy to control the robot.

In the present invention, the second arm may be shorter than the first arm to prevent the first joint part and the fifth joint part from interfering with each other. With this configuration, it is possible to fold the robot compactly. Therefore, it is possible to reduce the packing costs and the transportation costs for the robot.

In the present invention, the first joint part and the second joint part may have the same structure, the fifth joint part and the sixth joint part may have the same structure, and the fifth joint part and the sixth joint part may be smaller than the first joint part and the second joint part. With this configuration, it is possible to reduce the weight of the tip side of the robot, and as a result, it is possible to reduce the load exerted on the base end side of the robot.

In the present invention, the third joint part may have the same structure as the first joint part and the second joint part, the fourth joint part may have the same structure as the fifth joint part and the sixth joint part, the first arm and the second arm may be formed in a cylindrical shape, and an outer diameter of the second arm may be smaller than an outer diameter of the first arm. With this configuration, it is possible to further reduce the weight of the tip side of the robot, and as a result, it is possible to further reduce the load exerted on the base end side of the robot.

In the present invention, for example, the robot may include at least one of the first coupling member and the second coupling member so that an axial center of the output shaft in the first joint part and an axial center of the output shaft in the sixth joint part are disposed on the same straight line in a front face-to-front face posture in which the axial center of the output shaft in the first joint part, an axial center of the output shaft in the second joint part, an axial center of the output shaft in the third joint part, an axial center of the output shaft in the fourth joint part, an axial center of the output shaft in the fifth joint part, and the axial center of the output shaft in the sixth joint part are disposed on the same plane and the base-end-side biaxial joint unit and the tip-side biaxial joint unit are closest to each other.

Advantageous Effects of Invention

As described above, according to the present invention, in a robot equipped with two joint parts attached to an end of an arm in a coupled state, it is possible to increase a coupling strength of the two joint parts and it is possible to couple the two joint parts with high accuracy.

DESCRIPTION OF EMBODIMENTS

Embodiments of the present invention will be described below with reference to the drawings.
(Schematic Configuration of Industrial Robot)

Figure 1:
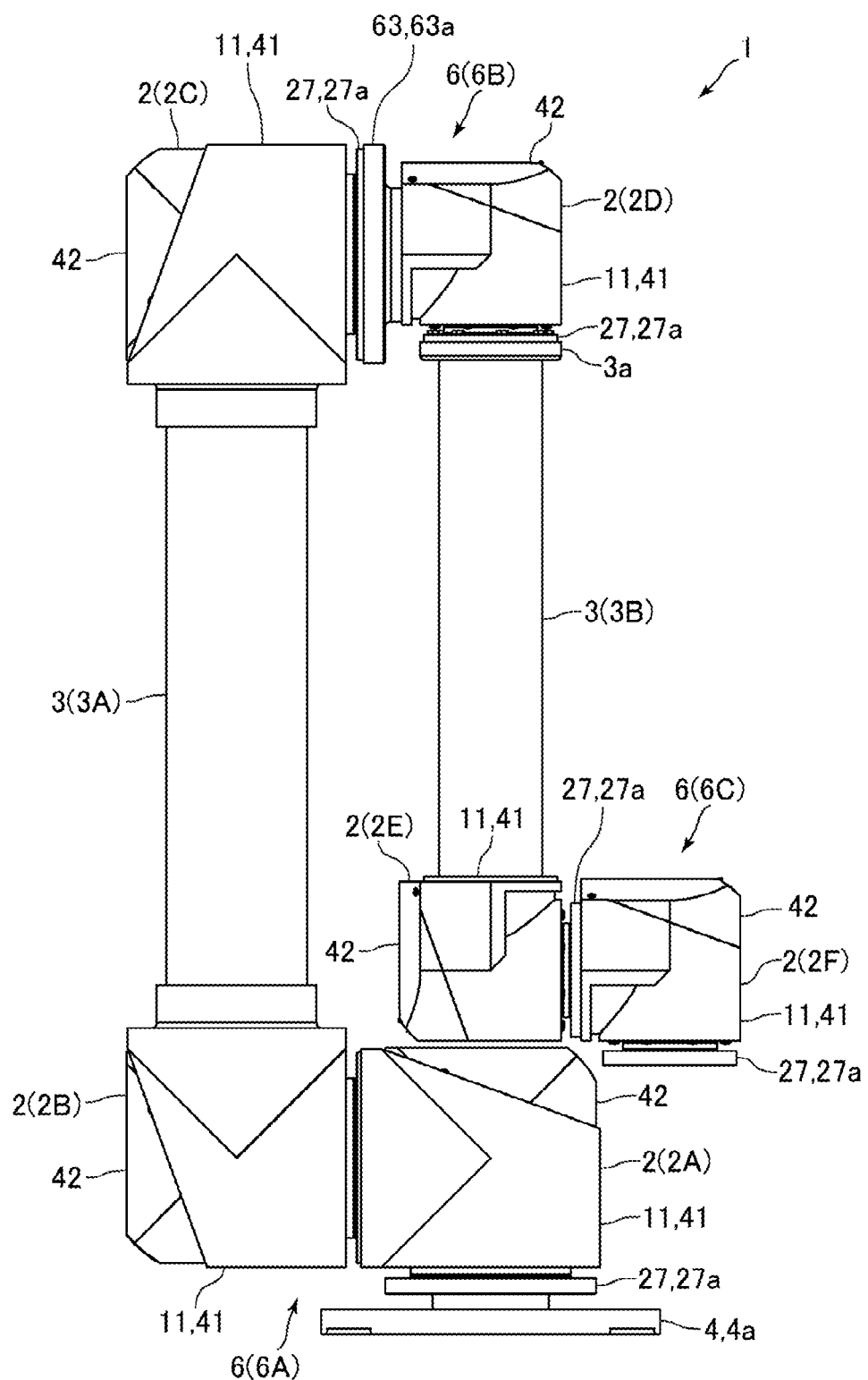
FIG. 1 is a front view of an industrial robot according to an embodiment of the present invention.
Figure 2A:
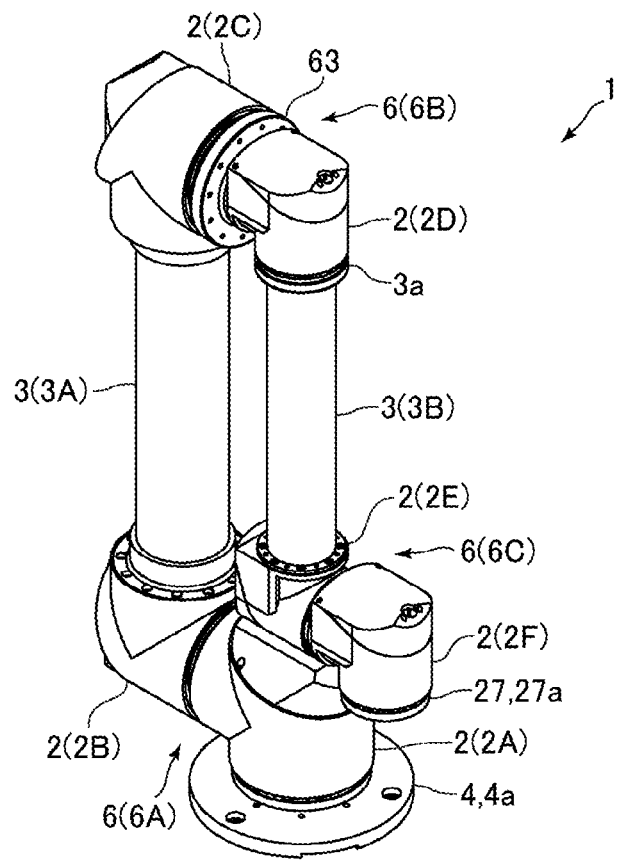
FIG. 2(A) is a perspective view of the industrial robot illustrated in FIG. 1
Figure 2B:
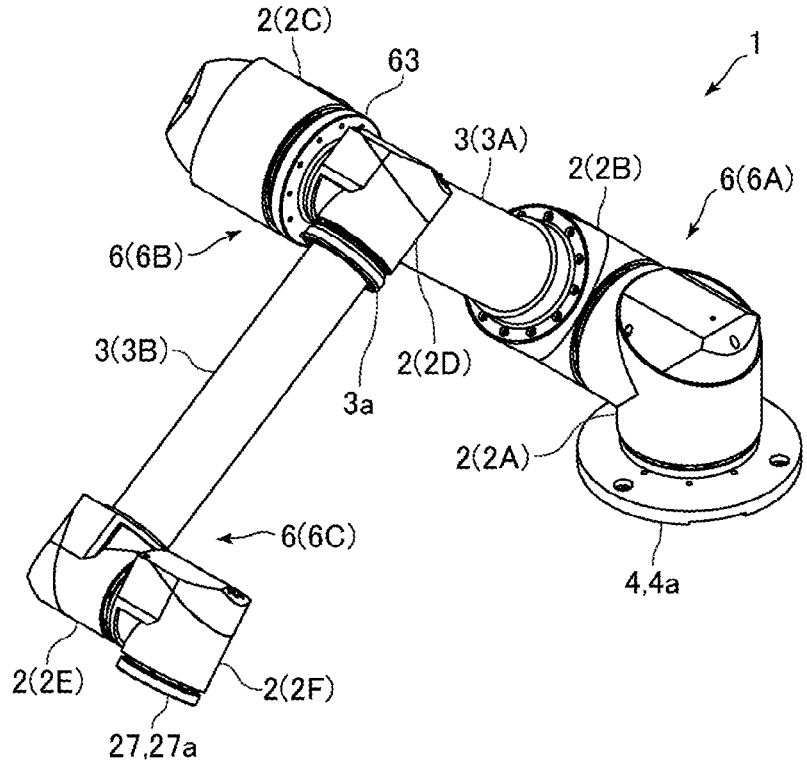
FIG. 2(B) is a perspective view showing a state in which the industrial robot illustrated in FIG. 2(A) is operating.

FIG. 1 is a front view of an industrial robot 1 according to an embodiment of the present invention. FIG. 2(A) is a perspective view of the industrial robot 1 illustrated in FIG. 1 and FIG. 2(B) is a perspective view showing a state in which the industrial robot 1 illustrated in FIG. 2(A) is operating.

The industrial robot 1 according to the embodiment (hereinafter referred to as a "robot 1") is an articulated robot used for assembling and manufacturing a predetermined product and is installed and used in an assembly line and a manufacturing line. The robot 1 includes a plurality of joint parts 2 and a plurality of arms 3. In the embodiment, the robot 1 includes six joint parts 2 and two arms 3. Hereinafter, when the six joint parts 2 are distinguished from each other, the six joint parts 2 are referred to as a "first joint part 2A," a "second joint part 2B," a "third joint part 2C," a "fourth joint part 2D," a "fifth joint part 2E," and a "sixth joint part 2F," respectively. Furthermore, hereinafter, when the two arms 3 are distinguished from each other, the two arms 3 are referred to as a "first arm 3A" and a "second arm 3B," respectively.

Also, the robot 1 includes a support member 4 constituting a base end portion of the robot 1. The support member 4 is coupled to the first joint part 2A to be relatively rotatable. The support member 4 is formed in a flanged cylindrical shape having the flange part 4a and a through hole (not shown) passing in an axial direction of the support member 4 is formed on an inner circumferential side of the support member 4. The flange part 4a is formed in an annular shape and forms a bottom face portion of the robot 1.

Each of the arms 3 is formed in an elongated longitudinal shape. To be specific, each of the arms 3 is formed in an elongated cylindrical shape. An outer diameter of the second arm 3B is smaller than an outer diameter of the first arm 3A and an inner diameter of the second arm 3B is smaller than an inner diameter of the first arm 3A. Furthermore, a length of the second arm 3B is shorter than a length of the first arm 3A.

In the robot 1, the first joint part 2A and the second joint part 2B are coupled to be relatively rotatable and the second joint part 2B and a base end of the first arm 3A are fixed together. Furthermore, a tip of the first arm 3A and the third joint part 2C are fixed together, the third joint part 2C and the fourth joint part 2D are coupled to be relatively rotatable, the fourth joint part 2D and a base end of the second arm 3B are coupled to be relatively rotatable, a tip of the second arm 3B and the fifth joint part 2E are fixed together, and the fifth joint part 2E and the sixth joint part 2F are coupled to be relatively rotatable. An end effector such as a hand and a tool can be attached to the sixth joint part 2F to be relatively rotatable.

In the embodiment, a base-end-side biaxial joint unit 6A disposed between the support member 4 and the first arm 3A is constituted of the first joint part 2A and the second joint part 2B, an intermediate biaxial joint unit 6B disposed between the first arm 3A and the second arm 3B is constituted of the third joint part 2C and the fourth joint part 2D, and a tip-side biaxial joint unit 6C attached to the tip of the second arm 3B is constituted of the fifth joint part 2E and the sixth joint part 2F. In other words, the robot 1 includes a plurality of biaxial joint units 6 constituted of two joint parts 2 and arms 3 configured to couple two respective biaxial joint units 6 among the biaxial joint units 6. To be specific, the robot 1 includes three biaxial joint units 6 and two arms 3.

Also, in the embodiment, the first joint part 2A, the fourth joint part 2D, and the sixth joint part 2F are one joint parts which are one joint parts 2 of two joint parts 2 constituting the biaxial joint units 6. The second joint part 2B, the third joint part 2C, and the fifth joint part 2E are the other joint parts which are the other joint parts 2 of the two joint parts 2 constituting the biaxial joint units 6. A specific configuration of each of the joint parts 2 will be described below.

In the embodiment, the first joint part 2A, the second joint part 2B, and the third joint part 2C have the same structure, and the fourth joint part 2D, the fifth joint part 2E, and the sixth joint part 2F have the same structure. That is to say, as illustrated in FIG. 1, the first joint part 2A, the second joint part 2B, and the third joint part 2C are formed to have the same size and the fourth joint part 2D, the fifth joint part 2E, and the sixth joint part 2F are formed to have the same size. Furthermore, the fourth joint part 2D, the fifth joint part 2E, and the sixth joint part 2F are smaller than the first joint part 2A, the second joint part 2B, and the third joint part 2C.

Here, the first joint part 2A, the second joint part 2B, the third joint part 2C, the fourth joint part 2D, the fifth joint part 2E, and the sixth joint part 2F are similarly configured except that their sizes differ. For this reason, reduction ratios of reduction gears 8, which will be described later, included in the first joint part 2A, the second joint part 2B, the third joint part 2C, the fourth joint part 2D, the fifth joint part 2E, and the sixth joint part 2F are all equal to each other. In other words, reduction ratios of six reduction gears 8 included in six joint parts 2 are equal to each other.

Configuration of Joint Part

Figure 3:
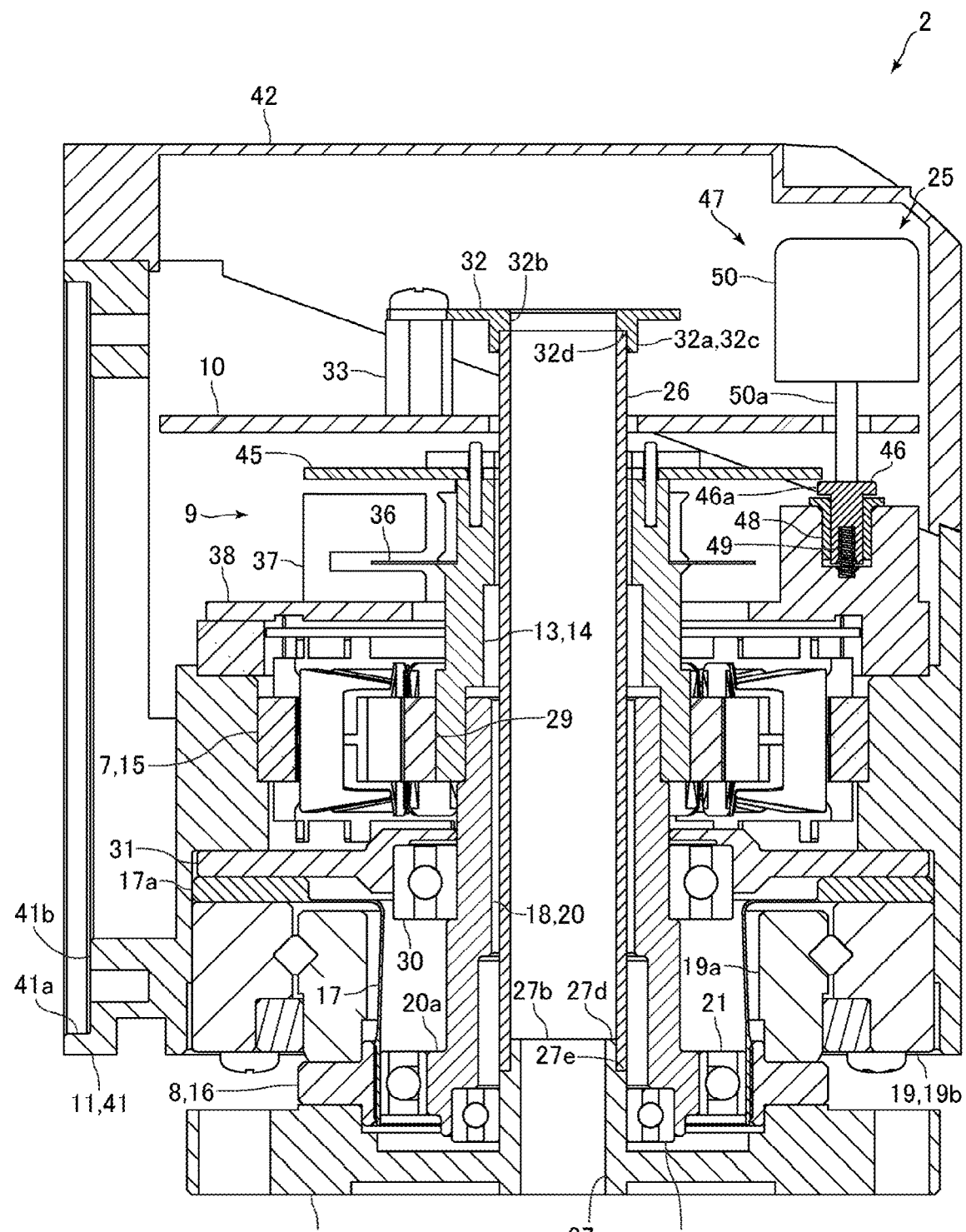
FIG. 3 is a longitudinal cross-sectional view of a joint part illustrated in FIG. 1.
Figure 4:
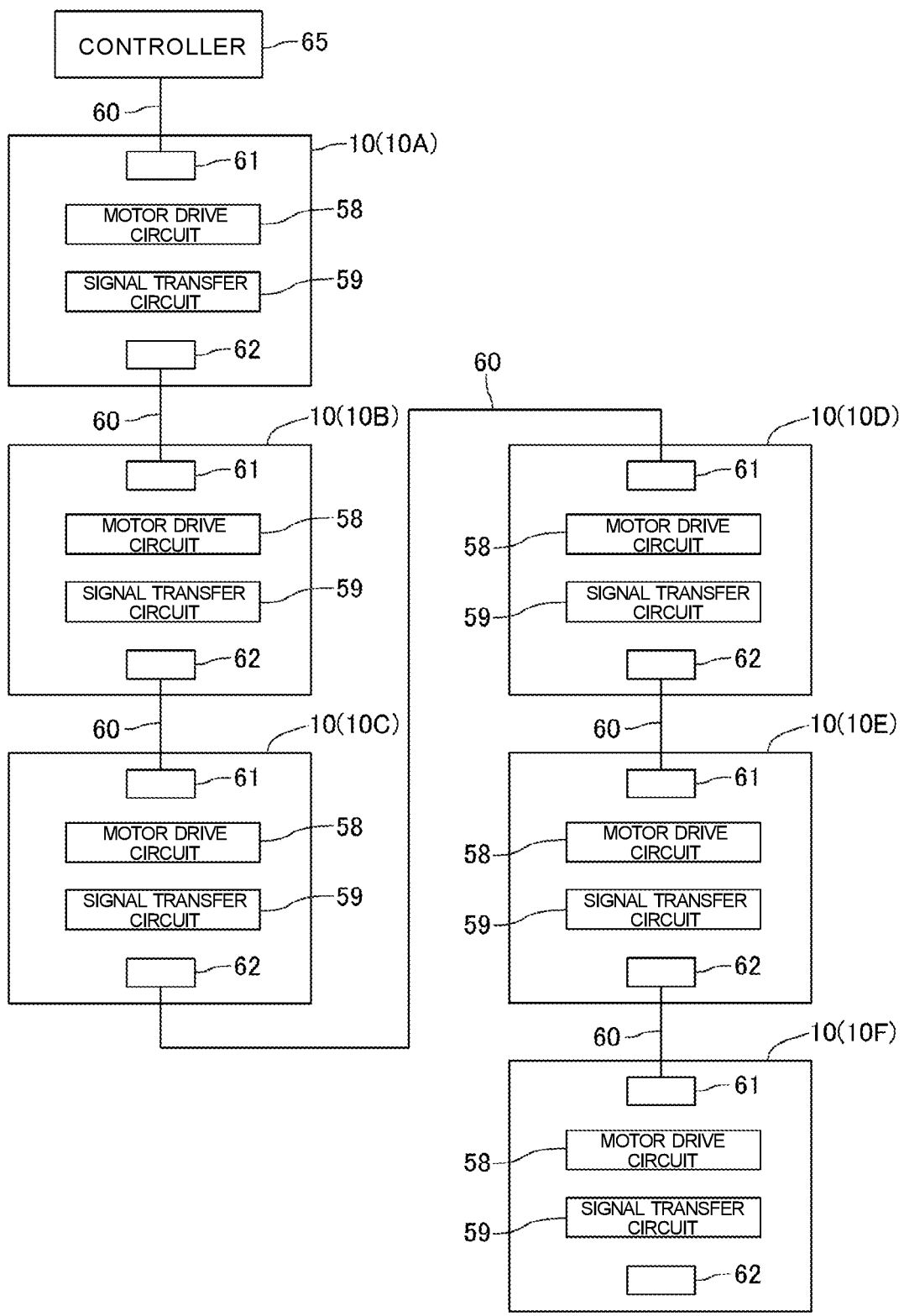
FIG. 4 is a block diagram for explaining an electrical connection relationship between a first joint part, a second joint part, a third joint part, a fourth joint part, a fifth joint part, and a sixth joint part illustrated in FIG. 1.

FIG. 3 is a longitudinal cross-sectional view of the joint part 2 illustrated in FIG. 1. FIG. 4 is a block diagram for explaining an electrical connection relationship between the first joint part 2A, the second joint part 2B, the third joint part 2C, the fourth joint part 2D, the fifth joint part 2E, and the sixth joint part 2F illustrated in FIG. 1. Hereinafter, for the sake of convenience of explanation, a Z1 direction side in FIG. 3 is set to an "upper" side and a Z2 direction side which is an opposite side thereof is set to a "lower" side.

The joint part 2 (more specifically, each of the first joint part 2A, the second joint part 2B, the third joint part 2C, the fourth joint part 2D, the fifth joint part 2E, and the sixth joint part 2F) includes a motor 7, the reduction gears 8 coupled to the motor 7, a position detection mechanism 9 configured to detect a rotational position of the motor 7, a circuit board 10 to which the motor 7 and the position detection mechanism 9 are electrically connected, and a case 11 having the motor 7, the reduction gears 8, the position detection mechanism 9, and the circuit board 10 housed therein. The motor 7 is a hollow motor having a through hole formed at a center in a radial direction and includes a hollow rotating shaft 13. Furthermore, the motor 7 includes a rotor 14 and a stator 15. Each of the reduction gears 8 is a hollow reduction gear having a through hole formed at a center in the radial direction. The motor 7 and the reduction gears 8 are disposed to overlap in a up-down direction. To be specific, the motor 7 is disposed on an upper side and the reduction gear 8 is disposed on a lower side. Furthermore, the motor 7 and the reduction gears 8 are disposed coaxially.

The reduction gear 8 in the embodiment is a hollow wave gear device and includes a rigid internal gear 16, a flexible external gear 17, a wave generation unit 18, and a cross roller bearing 19. The wave generation unit 18 includes a hollow input shaft 20 coupled to a rotating shaft 13 and a wave bearing 21 attached to an outer circumferential side of the input shaft 20. In the embodiment, the rigid internal gear 16 is an output shaft of the reduction gear 8. Furthermore, in the embodiment, the rigid internal gear 16 which is the output shaft of the reduction gear 8, the input shaft 20 of the reduction gear 8, and the rotating shaft 13 of the motor 7 are disposed coaxially. The joint part 2 (more specifically, each of the first joint part 2A, the second joint part 2B, the third joint part 2C, the fourth joint part 2D, the fifth joint part 2E, and the sixth joint part 2F) includes a rotation restriction mechanism 25 configured to restrict the rotation of the stopped rotor 14, a cylindrical tubular member 26 inserted into an inner circumferential side of the rotating shaft 13 and the input shaft 20, and an output-side member 27 fixed to the rigid internal gear 16.

As described above, the motor 7 includes the rotor 14 and the stator 15. The rotor 14 includes the rotating shaft 13 and a driving magnet 29 fixed to the rotating shaft 13. The rotating shaft 13 is formed in a substantially cylindrical shape elongated in the up-down direction and is disposed so that an axial direction of the rotating shaft 13 and the up-down direction coincide with each other. In other words, the up-down direction is the axial direction of the rotating shaft 13 and the axial direction of the rotor 14. The driving magnet 29 is formed in a cylindrical shape. A length of the driving magnet 29 (the length in the up-down direction) is shorter than that of the rotating shaft 13 and the driving magnet 29 is fixed to an outer circumferential face of a lower end side part of the rotating shaft 13. In the embodiment, the driving magnet 29 is fixed to the outer circumferential face of the rotating shaft 13 so that a lower end face of the rotating shaft 13 and a lower end face of the driving magnet 29 coincide with each other.

The stator 15 is formed in a substantially cylindrical shape as a whole and is disposed on an outer circumferential side of the driving magnet 29 to cover an outer circumferential face of the driving magnet 29. An upper end side part of the rotating shaft 13 protrudes further upward than an upper end face of the stator 15. The stator 15 includes a driving coil and a stator core having a plurality of projection poles around which the driving coil is wound via an insulator. The projection poles in the stator core are formed to project toward an inner circumferential side and tip faces of the projection poles face the outer circumferential face of the driving magnet 29. The motor 7 is fixed to the case 11. To be specific, an outer circumferential face of the stator 15 is fixed to the case 11.

As described above, the reduction gear 8 includes the rigid internal gear 16, the flexible external gear 17, the wave generation unit 18, and the cross roller bearing 19. The rigid internal gear 16 is formed in a flattened substantially cylindrical shape and is disposed so that an axial direction of the rigid internal gear 16 and the up-down direction are aligned. In other words, the up-down direction is the axial direction of the rigid internal gear 16 which is the output shaft of the reduction gear 8. The rigid internal gear 16 is fixed to an inner ring 19a of the cross roller bearing 19. An outer ring 19b of the cross roller bearing 19 is fixed to a lower end side part of the case 11, and the rigid internal gear 16 is rotatably held by the lower end side part of the case 11 via the cross roller bearing 19.

The flexible external gear 17 is formed in a substantially tubular shape with a rim having a flange part 17a at its upper end. The flange part 17a is formed in a substantially annular shape and an outer circumferential side part of the flange part 17a is fixed to the case 11. That is, the reduction gear 8 is fixed to the case 11. The rigid internal gear 16 constitutes a lower end side part of the reduction gear 8. The flange part 17a constitutes an upper end side part of the reduction gear 8. Internal teeth are formed on the inner circumferential face of the rigid internal gear 16. On the outer circumferential surface on the lower end side of the flexible external gear 17, external teeth meshed with the internal teeth of the rigid internal gear 16 are formed.

As described above, the wave generation unit 18 includes the input shaft 20 and the wave bearing 21. The input shaft 20 is formed in a tubular shape elongated in the up-down direction as a whole and is disposed so that the axial direction of the input shaft 20 coincides with the up-down direction. A part other than the lower end side part of the input shaft 20 is formed in an elongated and substantially cylindrical shape. The lower end side part of the input shaft 20 becomes an elliptical part 20a in which the shape of the inner circumferential surface when viewed in the axial direction of the input shaft 20 is a circular shape and the shape of the outer circumferential surface when viewed in the axial direction of the input shaft 20 is an elliptical shape.

The upper end side part of the input shaft 20 is inserted into and fixed to the inner circumferential side of the lower end side part of the rotation shaft 13. Specifically, the upper end side part of the input shaft 20 is inserted and fixed to the inner circumferential side of a part of the rotation shaft 13 to which the driving magnet 29 is fixed. The rotation shaft 13 and the input shaft 20 are disposed on the same axis. In addition, the upper end side part of the input shaft 20 is fixed to the rotation shaft 13 by bonding.

The central part of the input shaft 20 in the up-down direction is rotatably supported by a bearing 30. The bearing 30 is a ball bearing. The bearing 30 is attached to a bearing holding member 31, and the bearing holding member 31 is fixed to the case 11. That is, the input shaft 20 is rotatably supported by the bearing 30 attached to the case 11 via the bearing holding member 31. The bearing holding member 31 is formed in an annular and flat plate shape, and is fixed to the case 11 so that it overlaps the flange part 17a of the flexible external gear 17 in the up-down direction.

The wave bearing 21 is a ball bearing including a flexible inner ring and outer ring. The wave bearing 21 is disposed along the outer circumferential surface of the elliptical part 20a and is bent elliptically. A lower end side part of the flexible external gear 17 in which external teeth are formed is disposed on the outer circumferential side of the wave bearing 21 to surround the wave bearing 21, and this part is bent elliptically. The external teeth of the flexible external gear 17 are meshed with the internal teeth of the rigid internal gear 16 at two parts of the lower end side part of the flexible external gear 17 bent elliptically in the long axis direction.

The output-side member 27 is formed in a substantially cylindrical shape with a rim including a flange part 27a and a cylindrical part 27b. The output-side member 27 is disposed so that the axial direction of the output-side member 27 coincides with the up-down direction, and a through-hole 27c that penetrates in the up-down direction is formed on the inner circumferential side of the output-side member 27. The flange part 27a is formed in a flat plate and annular shape and is connected to the lower end of the cylindrical part 27b. The flange part 27a is fixed to the rigid internal gear 16 so that the upper surface of the flange part 27a comes in contact with the lower surface of the rigid internal gear 16. In addition, the flange part 27a is disposed below the lower end of the case 11 and is disposed outside the case 11.

On the upper end side of the cylindrical part 27b, a small-diameter part 27d having a smaller outer diameter than the lower end side part of the cylindrical part 27b is formed. On the outer circumferential side of the upper end side part of the cylindrical part 27b, an annular stepped surface 27e that is orthogonal to the up-down direction is formed. The small-diameter part 27d is inserted into the inner circumferential side of the lower end side part of the tubular member 26 and the lower end surface of the tubular member 26 faces the stepped surface 27e. In addition, the through-hole 27c communicates with the inner circumferential side of the tubular member 26. The upper end side part of the cylindrical part 27b is disposed on the inner circumferential side of the lower end side part of the input shaft 20. A bearing 34 is disposed between the outer circumferential surface of the cylindrical part 27b and the inner circumferential surface of the lower end side part of the input shaft 20. The bearing 34 is a ball bearing.

The tubular member 26 is formed in a cylindrical shape elongated in the up-down direction and is disposed so that the axial direction of the tubular member 26 coincides with the up-down direction. As described above, the tubular member 26 is inserted into the inner circumferential side of the rotation shaft 13 and the input shaft 20. The upper end surface of the tubular member 26 is disposed above the upper end surface of the rotation shaft 13, and the lower end surface of the tubular member 26 is disposed above the lower end surface of the input shaft 20. In addition, as described above, the small-diameter part 27d of the output-side member 27 is inserted into the inner circumferential side of the lower end side part of the tubular member 26, the lower end surface of the tubular member 26 faces the stepped surface 27e, and the lower end side of the tubular member 26 is held by the output-side member 27.

The upper end side of the tubular member 26 is held by a holding member 32. The holding member 32 is fixed to a support 33, and the support 33 is fixed to the case 11. That is, the holding member 32 is fixed to the case 11 via the support 33. The holding member 32 includes a cylindrical holding part 32a for holding the upper end side of the tubular member 26. The holding part 32a is disposed so that the axial direction of the holding part 32a coincides with the up-down direction. On the inner circumferential side of the holding part 32a, a through-hole 32b that penetrates in the up-down direction is formed.

On the lower end side of the holding part 32a, a large-diameter part 32c having a larger inner diameter than the upper end side of the holding part 32a is formed. On the inner circumferential side of the lower end side part of the holding part 32a, an annular stepped surface 32d orthogonal to the up-down direction is formed. The upper end side of the tubular member 26 is inserted into the inner circumferential side of the large-diameter part 32c, and the upper end surface of the tubular member 26 faces the stepped surface 32d. In addition, the through-hole 32b communicates with the inner circumferential side of the tubular member 26.

The position detection mechanism 9 is disposed above the stator 15. The position detection mechanism 9 includes a slit plate 36 fixed to the upper end side of the rotation shaft 13 and a sensor 37. The sensor 37 is a transmission type optical sensor including a light emitting element and a light receiving element which are disposed to face each other. The sensor 37 is fixed to a support member 38. The support member 38 is fixed to the case 11. That is, the sensor 37 is fixed to the case 11 via the support member 38. The slit plate 36 is formed into a thin flat plate shape and formed in an annular shape. In the slit plate 36, a plurality of slit holes are formed at certain intervals in the circumferential direction of the slit plate 36. The slit plate 36 is fixed to the rotation shaft 13 so that a part of the slit plate 36 in the circumferential direction is disposed between the light emitting element and the light receiving element of the sensor 37.

The case 11 includes a case main body 41 of which both upper and lower ends are open and a cover 42 that blocks an opening on the upper end side of the case main body 41. An opening on the lower end side of the case main body 41 is blocked by the reduction gear 8. On a side surface of the case main body 41, an opening 41a that opens in a direction orthogonal to the up-down direction is formed. That is, in the case 11, the opening 41a that opens in a direction orthogonal to the up-down direction is formed. The opening 41a is formed to penetrate through a side part of the case main body 41.

Also, as illustrated in FIG. 3, the opening 41a is formed in a stepped hole shape and a planar attachment face 41b orthogonal to an opening direction of the opening 41a is formed in the opening 41a. In other words, the planar attachment face 41b parallel to the up-down direction is formed in the opening 41a. The attachment face 41b is formed on a portion of the opening 41a on an outer circumferential face side of the case main body 41. Furthermore, the attachment face 41b is formed in an annular shape. An outer diameter of the attachment face 41b is substantially equal to an outer diameter of the flange part 27a.

The rotation restriction mechanism 25 is housed in the case 11. The rotation restriction mechanism 25 includes a flat plate-like and substantially annular rotation-side restricting member 45 fixed to the rotor 14, a fixing-side restricting member 46 which is engaged with the rotation-side restricting member 45 and restricts movement of the rotation-side restricting member 45 in the circumferential direction of the rotor 14, a drive mechanism 47 that moves the fixing-side restricting member 46 in the up-down direction, and a linear bushing 48 that guides the fixing-side restricting member 46 in the up-down direction. The drive mechanism 47 includes a compression coil spring 49 that biases the fixing-side restricting member 46 upward and a solenoid 50 that moves the fixing-side restricting member 46 downward.

The fixing-side restricting member 46 is formed in a columnar shape with a rim having a flange part 46a at its upper end, and is disposed so that the axial direction of the fixing-side restricting member 46 coincides with the up-down direction. The fixing-side restricting member 46 is fixed to a plunger 50a of the solenoid 50 disposed on the upper side of the fixing-side restricting member 46. On the lower end surface of the fixing-side restricting member 46, a concave part that is recessed toward the upper side is formed. An upper end side part of the compression coil spring 49 is disposed in the concave part.

The linear bushing 48 is formed in a cylindrical shape with a rim having a flange part at its upper end and is disposed so that the axial direction of the linear bushing 48 coincides with the up-down direction. A part of the linear bushing 48 below the flange part is disposed in the concave part formed on the upper surface of the support member 38. On a bottom of the concave part, a recess in which the lower end side part of the compression coil spring 49 is disposed is formed to be recessed downward. On the inner circumferential side of the linear bushing 48, a part of the fixing-side restricting member 46 below the flange part 46a is disposed.

The rotation-side restricting member 45 is fixed to the upper end surface of the rotation shaft 13 so that the thickness direction of the rotation-side restricting member 45 coincides with the up-down direction, and is disposed above the position detection mechanism 9. On the rotation-side restricting member 45, a plurality of protrusions that protrude radially outward from the rotor 14 are formed at certain intervals in the circumferential direction of the rotor 14.

When the solenoid 50 is not energized, the fixing-side restricting member 46 is raised by a biasing force of the compression coil spring 49 so that the flange part 46a of the fixing-side restricting member 46 is disposed between protrusions of the rotation-side restricting member 45 in the circumferential direction of the rotor 14. Therefore, rotation of the rotor 14 that is stopped is restricted according to the protrusion of the rotation-side restricting member 45 and the flange part 46a. On the other hand, when the solenoid 50 is energized, as shown in FIG. 3, the fixing-side restricting member 46 descends until the plunger 50a protrudes downward and the flange part 46a is disengaged from between protrusions of the rotation-side restricting member 45 in the circumferential direction of the rotor 14. Therefore, the rotor 14 is rotatable.

The circuit board 10 is a rigid board such as a glass epoxy board and is formed in a flat plate shape. The circuit board 10 is fixed to the case 11 so that the thickness direction of the circuit board 10 coincides with the up-down direction. In addition, the circuit board 10 is fixed to the upper end side of the case 11 and is disposed above the rotation-side restricting member 45. The upper end of the tubular member 26 is disposed above the upper surface of the circuit board 10.

As shown in FIG. 4, on the circuit board 10, a motor driving circuit 58 configured to drive the motor 7 and a signal transmission circuit 59 configured to output a signal input to the circuit board 10 to the outside of the circuit board 10 are mounted. In addition, on the circuit board 10, connectors 61 and 62 to which an end of a wiring 60 is connected is mounted. Specifically, at least two connectors 61 and 62 are mounted on the circuit board 10. The connectors 61 and 62 are mounted on the upper surface of the circuit board 10. Here, the connectors 61 and 62 are a male type or female type connector, and when male type or female type connectors fixed to an end of the wiring 60 are engaged with the connectors 61 and 62, an end of the wiring 60 is connected to the connectors 61 and 62.

For example, the signal transmission circuit 59 is provided to output an output signal (specifically, an output signal from the sensor 37) from the position detection mechanism 9 or a signal obtained by processing the output signal on the circuit board 10 from the connector 61 or the connector 62 to the outside of the circuit board 10. In addition, the signal transmission circuit 59 is provided to output a signal input from the connector 61 to the connector 62 and output a signal input from the connector 62 from the connector 61.

(Structure of Connecting Joint Parts and Arms)

As described above, the support member 4 and the first joint part 2A are connected in a relatively rotatable manner, the first joint part 2A and the second joint part 2B are connected in a relatively rotatable manner, the second joint part 2B and a base end of the first arm 3A are fixed, a tip of the first arm 3A and the third joint part 2C are fixed, the third joint part 2C and the fourth joint part 2D are connected in a relatively rotatable manner, the fourth joint part 2D and a base end of the second arm 3B are connected in a relatively rotatable manner, a tip of the second arm 3B and the fifth joint part 2E are fixed, and the fifth joint part 2E and the sixth joint part 2F are connected in a relatively rotatable manner. Specifically, for example, the joint parts 2 and the arms 3 are connected as described above so that the robot 1 can perform the operation shown in FIG. 2(B).

Here, in the following description, the axial direction of the rigid internal gear 16 of the first joint part 2A will be defined as "the axial direction of the first joint part 2A," the axial direction of the rigid internal gear 16 of the second joint part 2B will be defined as "the axial direction of the second joint part 2B," the axial direction of the rigid internal gear 16 of the third joint part 2C will be defined as "the axial direction of the third joint part 2C," the axial direction of the rigid internal gear 16 of the fourth joint part 2D will be defined as "the axial direction of the fourth joint part 2D," the axial direction of the rigid internal gear 16 of the fifth joint part 2E will be defined as "the axial direction of the fifth joint part 2E," and the axial direction of the rigid internal gear 16 of the sixth joint part 2F will be defined as "the axial direction of the sixth joint part 2F."

First, the support member 4 and the first joint part 2A are coupled when the flange part 27a of the output-side member 27 in the first joint part 2A is fixed to the support member 4. To be specific, the support member 4 and the first joint part 2A are coupled when the flange part 27a of the first joint part 2A is fixed to an end face of the support member 4 on a side on which the flange part 4a is not formed. That is to say, the support member 4 and the first joint part 2A are coupled so that the axial direction of the first joint part 2A and the axial direction of the support member 4 coincide with each other (more specifically, so that an axial center of the rigid internal gear 16 in the first joint part 2A and an axial center of the support member 4 coincide with each other). The through hole 27c of the output-side member 27 in the first joint part 2A communicates with a through hole of the support member 4.

The first joint part 2A and the second joint part 2B are coupled so that the axial direction of the first joint part 2A and the axial direction of the second joint part 2B are orthogonal to each other. Furthermore, the attachment face 41b of the case 11 of the first joint part 2A and the flange part 27a in the second joint part 2B are directly fixed together and a side of the case main body 41 in the first joint part 2A on which the opening 41a is formed is fixed to the flange part 27a of the second joint part 2B. One face of the flange part 27a in the second joint part 2B (a lower face in FIG. 3) is in contact with the attachment face 41b of the first joint part 2A. The flange part 27a in the second joint part 2B closes the opening 41a of the case main body 41 in the first joint part 2A and the through hole 27c of the output-side member 27 in the second joint part 2B communicates with the inside of the case 11 in the first joint part 2A.

In this way, the base-end-side biaxial joint unit 6A is formed by directly fixing the attachment face 41b of the first joint part 2A to the flange part 27a of the second joint part 2B so that the axial direction of the first joint part 2A and the axial direction of the second joint part 2B are orthogonal to each other. Furthermore, the base-end-side biaxial joint unit 6A in which the axial direction of the first joint part 2A is set to an axial direction of rotation is rotatable relative to the support member 4.

The second joint part 2B and the first arm 3A are coupled so that the axial direction of the second joint part 2B and a longitudinal direction (axial direction) of the first arm 3A are orthogonal to each other. That is to say, the base-end-side biaxial joint unit 6A and the first arm 3A are coupled so that the axial direction of the second joint part 2B and the longitudinal direction of the first arm 3A are orthogonal to each other. Furthermore, the base end of the first arm 3A is fixed to the case 11 of the second joint part 2B. To be specific, the base end of the first arm 3A is fixed to a side of the case main body 41 in the second joint part 2B in which the opening 41a is formed. The base end of the first arm 3A closes the opening 41a of the case main body 41 in the second joint part 2B and an inner circumferential side of the first arm 3A communicates with the inside of the case 11 in the second joint part 2B.

The first arm 3A and the third joint part 2C are coupled so that the longitudinal direction of the first arm 3A and the axial direction of the third joint part 2C are orthogonal to each other. That is to say, the first arm 3A and the intermediate biaxial joint unit 6B are coupled so that the longitudinal direction of the first arm 3A and the axial direction of the third joint part 2C are orthogonal to each other. Furthermore, the tip of the first arm 3A is fixed to the case 11 of the third joint part 2C. To be specific, the tip of the first arm 3A is fixed to a side of the case main body 41 in the third joint part 2C in which the opening 41a is formed. The tip of the first arm 3A closes the opening 41a of the case main body 41 in the third joint part 2C and the inner circumferential side of the first arm 3A communicates with the inside of the case 11 in the third joint part 2C.

The third joint part 2C and the fourth joint part 2D are coupled so that the axial direction of the third joint part 2C and the axial direction of the fourth joint part 2D are orthogonal to each other. Furthermore, the attachment face 41b of the case 11 in the fourth joint part 2D and the flange part 27a of the third joint part 2C are fixed together via a coupling member 63 as a second coupling member having a predetermined thickness (length) in the axial direction of the third joint part 2C and a side of the case main body 41 in the fourth joint part 2D in which the opening 41a is formed is fixed to the flange part 27a in the third joint part 2C via the coupling member 63. In this way, the intermediate biaxial joint unit 6B is formed by fixing the attachment face 41b of the fourth joint part 2D to the flange part 27a of the third joint part 2C via the coupling member 63 so that the axial direction of the third joint part 2C and the axial direction of the fourth joint part 2D are orthogonal to each other.

The coupling member 63 is formed in a flanged cylindrical shape in which the flange part 63a fixed to the flange part 27a in the third joint part 2C is provided. The coupling member 63 closes the opening 41a of the case main body 41 in the fourth joint part 2D and a through hole passing in an axial direction of the coupling member 63 and the through hole 27c of the output-side member 27 in the third joint part 2C communicate with an inside of the case 11 in the fourth joint part 2D. An end face of the coupling member 63 on a side on which the flange part 63a is not formed is in contact with the attachment face 41b of the fourth joint part 2D.

The fourth joint part 2D and the second arm 3B are coupled so that the axial direction of the fourth joint part 2D and a longitudinal direction of the second arm 3B coincide with each other (more specifically, so that the axial center of the rigid internal gear 16 in the fourth joint part 2D and an axial center of the second arm 3B coincide with each other). That is to say, the intermediate biaxial joint unit 6B and the second arm 3B are coupled so that the axial direction of the fourth joint part 2D and the longitudinal direction of the second arm 3B coincide with each other). Furthermore, the base end of the second arm 3B is fixed to the flange part 27a of the fourth joint part 2D.

For this reason, the second arm 3B in which the axial direction of the third joint part 2C is set to an axial direction of rotation is rotatable relative to the first arm 3A. Furthermore, the second arm 3B in which the longitudinal direction of the second arm 3B (that is, the axial direction of the fourth joint part 2D) is set to an axial direction of rotation is rotatable relative to the intermediate biaxial joint unit 6B. An inner circumferential side of the second arm 3B communicates with the through hole 27c of the output-side member 27 in the fourth joint part 2D. The flange part 3a configured to fix the base end of the second arm 3B to the flange part 27a of the fourth joint part 2D is formed at the base end of the second arm 3B and the flange part 27a of the fourth joint part 2D and the flange part 3a are fixed to each other.

The second arm 3B and the fifth joint part 2E are coupled so that the longitudinal direction of the second arm 3B and the axial direction of the fifth joint part 2E are orthogonal to each other. That is to say, the second arm 3B and the tip-side biaxial joint unit 6C are coupled so that the longitudinal direction of the second arm 3B and the axial direction of the fifth joint part 2E are orthogonal to each other. Furthermore, the tip of the second arm 3B is fixed to the case 11 in the fifth joint part 2E. To be specific, the tip of the second arm 3B is fixed to a side of the case main body 41 in the fifth joint part 2E on which the opening 41a is formed. The tip of the second arm 3B closes the opening 41a of the case main body 41 in the fifth joint part 2E and the inner circumferential side of the second arm 3B communicates with the inside of the case 11 in the fifth joint part 2E.

The fifth joint part 2E and the sixth joint part 2F are coupled so that the axial direction of the fifth joint part 2E and the axial direction of the sixth joint part 2F are orthogonal to each other. Furthermore, the attachment face 41b of the case 11 in the sixth joint part 2F and the flange part 27a of the fifth joint part 2E are directly fixed together and a side of the case main body 41 in the sixth joint part 2F in which the opening 41a is formed is fixed to the flange part 27a of the fifth joint part 2E. One face of the flange part 27a in the fifth joint part 2E (the lower face in FIG. 3) is in contact with the attachment face 41b of the sixth joint part 2F. The flange part 27a in the fifth joint part 2E closes the opening 41a of the case main body 41 in the sixth joint part 2F and the through hole 27c of the output-side member 27 in the fifth joint part 2E communicates with the inside of the case 11 in the sixth joint part 2F.

In this way, the tip-side biaxial joint unit 6C is formed by directly fixing the attachment face 41b of the sixth joint part 2F to the flange part 27a of the fifth joint part 2E so that the axial direction of the fifth joint part 2E and the axial direction of the sixth joint part 2F are orthogonal to each other. Furthermore, as described above, the end effector can be attached to the sixth joint part 2F. To be specific, the end effector can be attached to the flange part 27a of the output-side member 27 in the sixth joint part 2F.

In the embodiment, in a front face-to-front face posture in which the axial center of the rigid internal gear 16 in the first joint part 2A, the axial center of the rigid internal gear 16 in the second joint part 2B, the axial center of the rigid internal gear 16 in the third joint part 2C, the axial center of the rigid internal gear 16 in the fourth joint part 2D, the axial center of the rigid internal gear 16 in the fifth joint part 2E, and the axial center of the rigid internal gear 16 in the sixth joint part 2F are disposed on the same plane and the base-end-side biaxial joint unit 6A and the tip-side biaxial joint unit 6C are closest to each other (a posture illustrated in FIGS. 1 and 2(A)), the axial center of the rigid internal gear 16 in the first joint part 2A and the axial center of the second arm 3B are disposed on the same straight line.

For this reason, the second arm 3B is rotatable relative to the first arm 3A using the axial direction of the third joint part 2C as an axial direction of rotation rotates on a plane including the axial center of the rigid internal gear 16 in the first joint part 2A. Furthermore, the second arm 3B is shorter than the first arm 3A so that the first joint part 2A and the fifth joint part 2E do not interfere with each other (so that the first joint part 2A and the fifth joint part 2E are prevented from interfering with each other).

(Wiring Drawing Structure)

A drawing structure of the wiring 60 inside the robot 1 will be described below. In the following description, the circuit board 10 of the first joint part 2A is referred to as a "circuit board 10A," the circuit board 10 of the second joint part 2B is referred to as a "circuit board 10B," the circuit board 10 of the third joint part 2C is referred to as a "circuit board 10C," the circuit board 10 of the fourth joint part 2D is referred to as a "circuit board 10D," the circuit board 10 of the fifth joint part 2E is referred to as a "circuit board 10E," and the circuit board 10 of the sixth joint part 2F is referred to as a "circuit board 10F."

As shown in FIG. 4, between the sixth joint part 2F and the fifth joint part 2E, the connector 61 of the circuit board 10F of the sixth joint part 2F and the connector 62 of the circuit board 10E of the fifth joint part 2E are connected by the wiring 60. That is, one end of the wiring 60 drawn out from the case 11 of the sixth joint part 2F is connected to the connector 61 of the circuit board 10F and the other end thereof is connected to the connector 62 of the circuit board 10E. The wiring 60 is drawn out from the case 11 of the sixth joint part 2F through the opening 41a of the sixth joint part 2F, drawn through the through-hole 27c of the output-side member 27 of the fifth joint part 2E and the inner circumferential side of the tubular member 26 of the fifth joint part 2E, and connected to the connector 62 of the circuit board 10E.

Between the fifth joint part 2E and the fourth joint part 2D, the connector 61 of the circuit board 10E of the fifth joint part 2E and the connector 62 of the circuit board 10D of the fourth joint part 2D are connected by the wiring 60. That is, one end of the wiring 60 drawn out from the case 11 of the fifth joint part 2E is connected to the connector 61 of the circuit board 10E and the other end thereof is connected to the connector 62 of the circuit board 10D. The wiring 60 is drawn out from the case 11 of the fifth joint part 2E through the opening 41a of the fifth joint part 2E, and drawn through the inner circumferential side of the second arm 3B, the through-hole 27c of the output-side member 27 of the fourth joint part 2D and the inner circumferential side of the tubular member 26 of the fourth joint part 2D, and is connected to the connector 62 of the circuit board 10D.

Between the fourth joint part 2D and the third joint part 2C, the connector 61 of the circuit board 10D of the fourth joint part 2D and the connector 62 of the circuit board 10C of the third joint part 2C are connected by the wiring 60. That is, one end of the wiring 60 drawn out from the case 11 of the fourth joint part 2D is connected to the connector 61 of the circuit board 10D and the other end thereof is connected to the connector 62 of the circuit board 10C. The wiring 60 is drawn out from the case 11 of the fourth joint part 2D through the opening 41a of the fourth joint part 2D, drawn through the through-hole of the connecting member 63, the through-hole 27c of the output-side member 27 of the third joint part 2C, and the inner circumferential side of the tubular member 26 of the third joint part 2C, and connected to the connector 62 of the circuit board 10C.

Between the third joint part 2C and the second joint part 2B, the connector 61 of the circuit board 10C of the third joint part 2C and the connector 62 of the circuit board 10B of the second joint part 2B are connected by the wiring 60. That is, one end of the wiring 60 drawn out from the case 11 of the third joint part 2C is connected to the connector 61 of the circuit board 10C and the other end thereof is connected to the connector 62 of the circuit board 10B. The wiring 60 is drawn out from the case 11 of the third joint part 2C through the opening 41a of the third joint part 2C, drawn through the inner circumferential side of the first arm 3A and the opening 41a of the second joint part 2B, and connected to the connector 62 of the circuit board 10B.

Between the second joint part 2B and the first joint part 2A, the connector 61 of the circuit board 10B of the second joint part 2B and the connector 62 of the circuit board 10A of the first joint part 2A are connected by the wiring 60. That is, one end of the wiring 60 drawn out from the case 11 of the second joint part 2B is connected to the connector 61 of the circuit board 10B, and the other end thereof is connected to the connector 62 of the circuit board 10A. The wiring 60 is drawn out from the case 11 of the second joint part 2B through the inner circumferential side of the tubular member 26 of the second joint part 2B and the through-hole 27c of the output-side member 27 of the second joint part 2B, drawn through the opening 41a of the first joint part 2A, and connected to the connector 62 of the circuit board 10A.

The connector 61 in the circuit board 10A is connected to a controller 65 of the robot 1 via the wiring 60. The wiring 60 is drawn out from the case 11 in the first joint part 2A to pass through the inner circumferential side of the tubular member 26 in the first joint part 2A and the through hole 27c of the output-side member 27 in the first joint part 2A and is drawn to pass through the through hole of the support member 4.

Main Effects of Embodiment

As described above, in the embodiment, the base-end-side biaxial joint unit 6A is formed by directly fixing the attachment face 41b in the first joint part 2A to the flange part 27a in the second joint part 2B, the intermediate biaxial joint unit 6B is formed by fixing the attachment face 41b in the fourth joint part 2D to the flange part 27a in the third joint part 2C via the coupling member 63, and the tip-side biaxial joint unit 6C is formed by directly fixing the attachment face 41b in the sixth joint part 2F to the flange part 27a in the fifth joint part 2E. That is to say, in the embodiment, the two joint parts 2 are coupled using the planar attachment face 41b and the flange part 27a. For this reason, in the embodiment, it is possible to increase a coupling strength of the two joint parts 2 and it is possible to couple the two joint parts 2 with high accuracy. Furthermore, since the two joint parts 2 are coupled using the attachment face 41b formed in the opening 41a and the annular flange part 27a in the embodiment, the wiring 60 can be drawn between the two joint parts 2 using the inner circumferential side of the flange part 27a and the opening 41a.

In the embodiment, the base-end-side biaxial joint unit 6A in which the axial direction of the first joint part 2A is set to an axial direction of rotation is rotatable relative to the support member 4. Furthermore, in the embodiment, the second arm 3B is rotatable relative to the first arm 3A using the axial direction of the third joint part 2C as an axial direction of rotation on a plane including the axial center of the rigid internal gear 16 in the first joint part 2A. For this reason, in the embodiment, it is easy to control the robot 1.

In the embodiment, in the front face-to-front face posture of the robot 1 illustrated in FIGS. 1 and 2(A), the axial center of the rigid internal gear 16 in the first joint part 2A and the axial center of the second arm 3B are disposed on the same straight line and the second arm 3B is shorter than the first arm 3A so that the first joint part 2A and the fifth joint part 2E do not interfere with each other. For this reason, in the embodiment, it is possible to compactly fold the robot 1, and as a result, it is possible to reduce the packing costs and the transportation costs for the robot 1.

In the embodiment, the fifth joint part 2E and the sixth joint part 2F are smaller than the first joint part 2A and the second joint part 2B. For this reason, in the embodiment, it is possible to reduce the weight of a tip side of the robot 1, and as a result, it is possible to reduce the load exerted on a base end side of the robot 1. Particularly, in the embodiment, the fourth joint part 2D is smaller than the third joint part 2C, an outer diameter of the second arm 3B is smaller than an outer diameter of the first arm 3A, and the second arm 3B is shorter than the first arm 3A. Thus, it is possible to further reduce the weight of a tip side of the robot 1. Therefore, in the embodiment, it is possible to further reduce the load exerted on a base end side of the robot 1.

Another Embodiment

While the above-described embodiment is an example of the preferred embodiments of the present invention, the present invention is not limited thereto. In addition, various modifications are possible without departing from the gist of the present invention.

Figure 5:
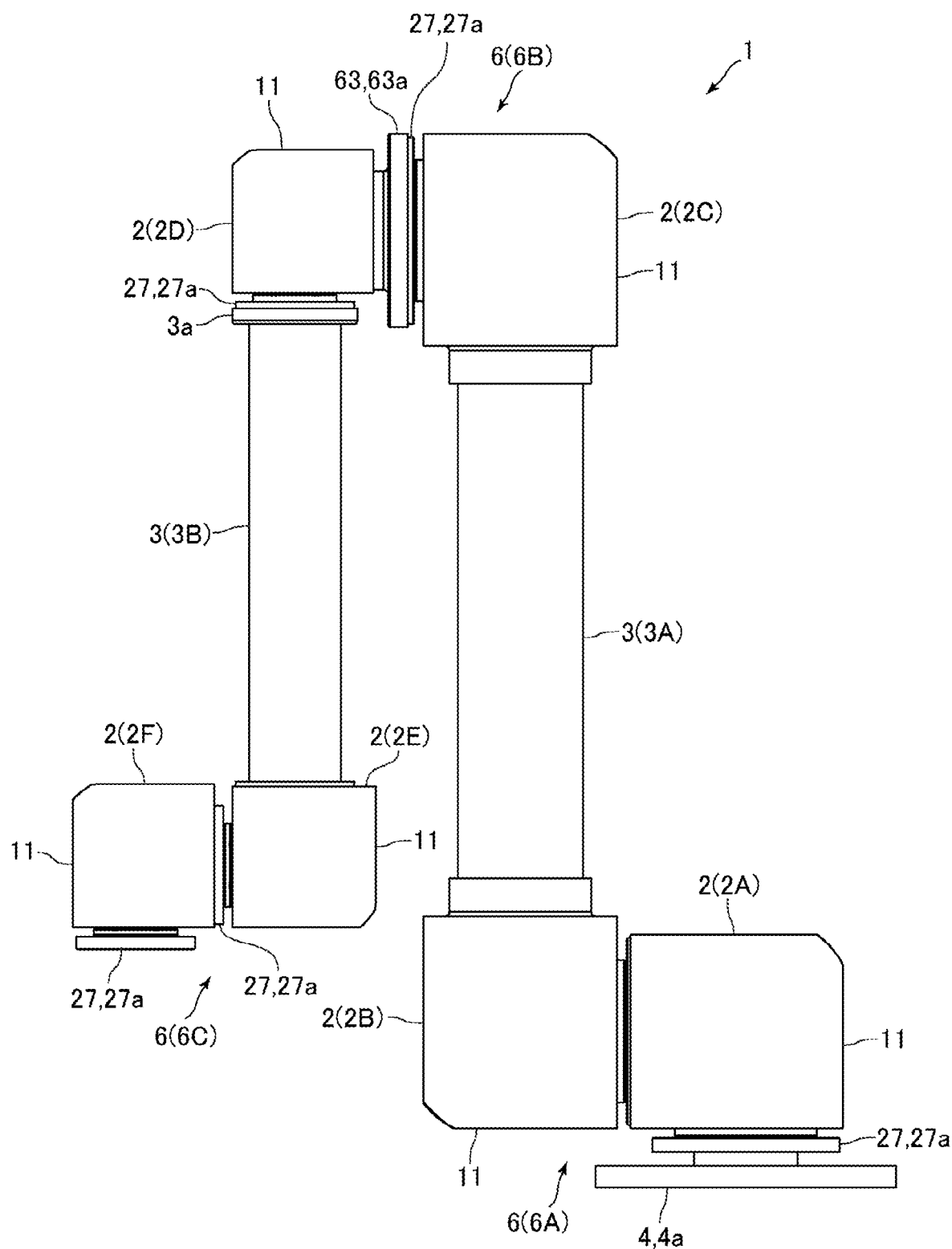
FIG. 5 is a front view of an industrial robot according to another embodiment of the present invention.
Figure 6:
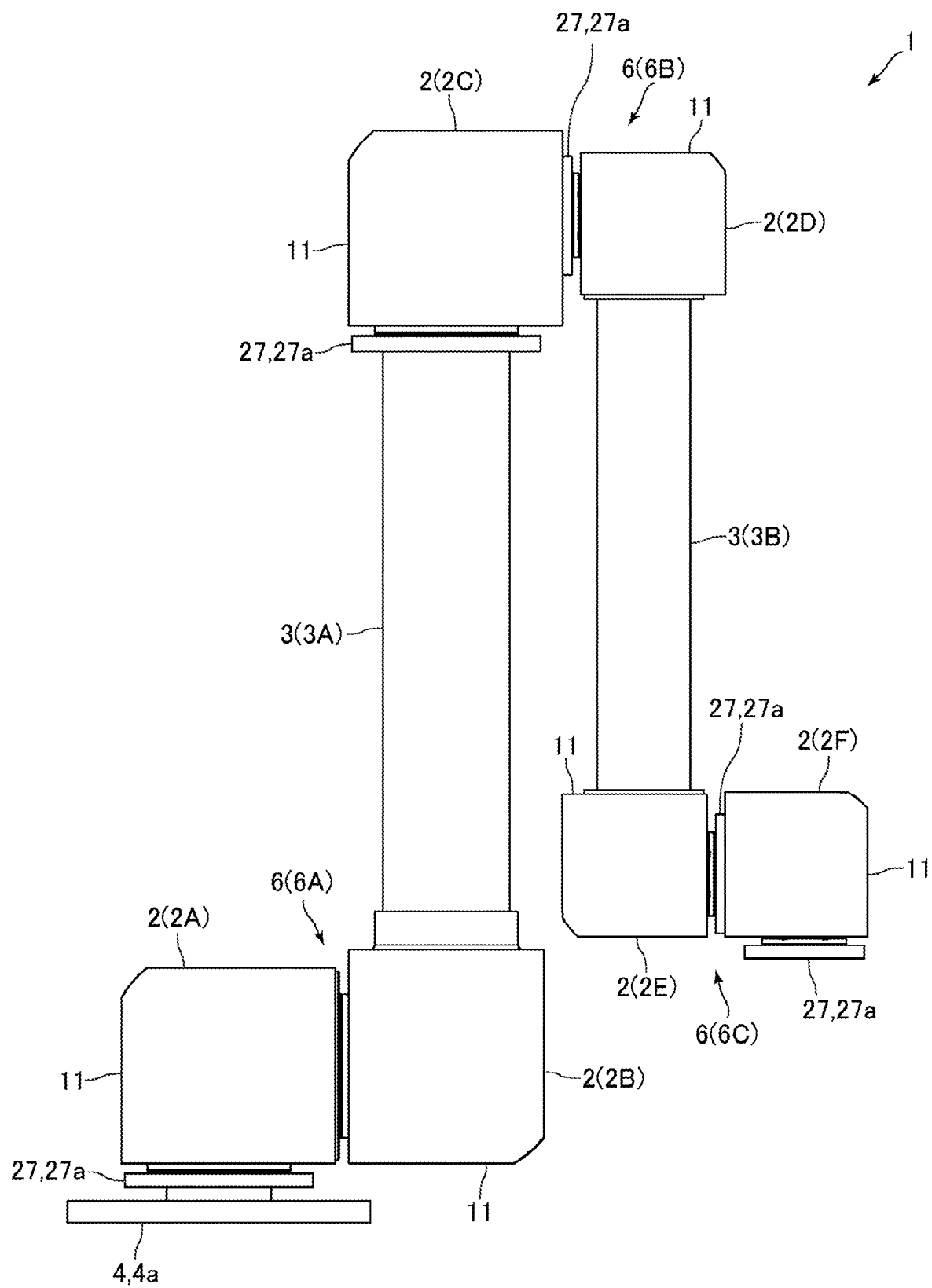
FIG. 6 is a front view of an industrial robot according to another embodiment of the present invention.

In the above-described embodiment, in the front face-to-front face posture of the robot 1 illustrated in FIGS. 1 and 2(A), the axial center of the rigid internal gear 16 in the first joint part 2A and the axial center of the second arm 3B are disposed on the same straight line. However, in the front face-to-front face posture of the robot 1, the axial center of the rigid internal gear 16 in the first joint part 2A and the axial center of the second arm 3B may not be disposed on the same straight line. For example, as illustrated in FIGS. 5 and 6, in the front face-to-front face posture of the robot 1, the axial center of the rigid internal gear 16 in the first joint part 2A and the axial center of the second arm 3B may not be disposed on the same straight line and the axial center of the rigid internal gear 16 in the first joint part 2A and the axial center of the rigid internal gear 16 in the sixth joint part 2F may not be disposed on the same straight line. In this case, a length of the second arm 3B may be equal to or more than a length of the first arm 3A.

Figure 7:
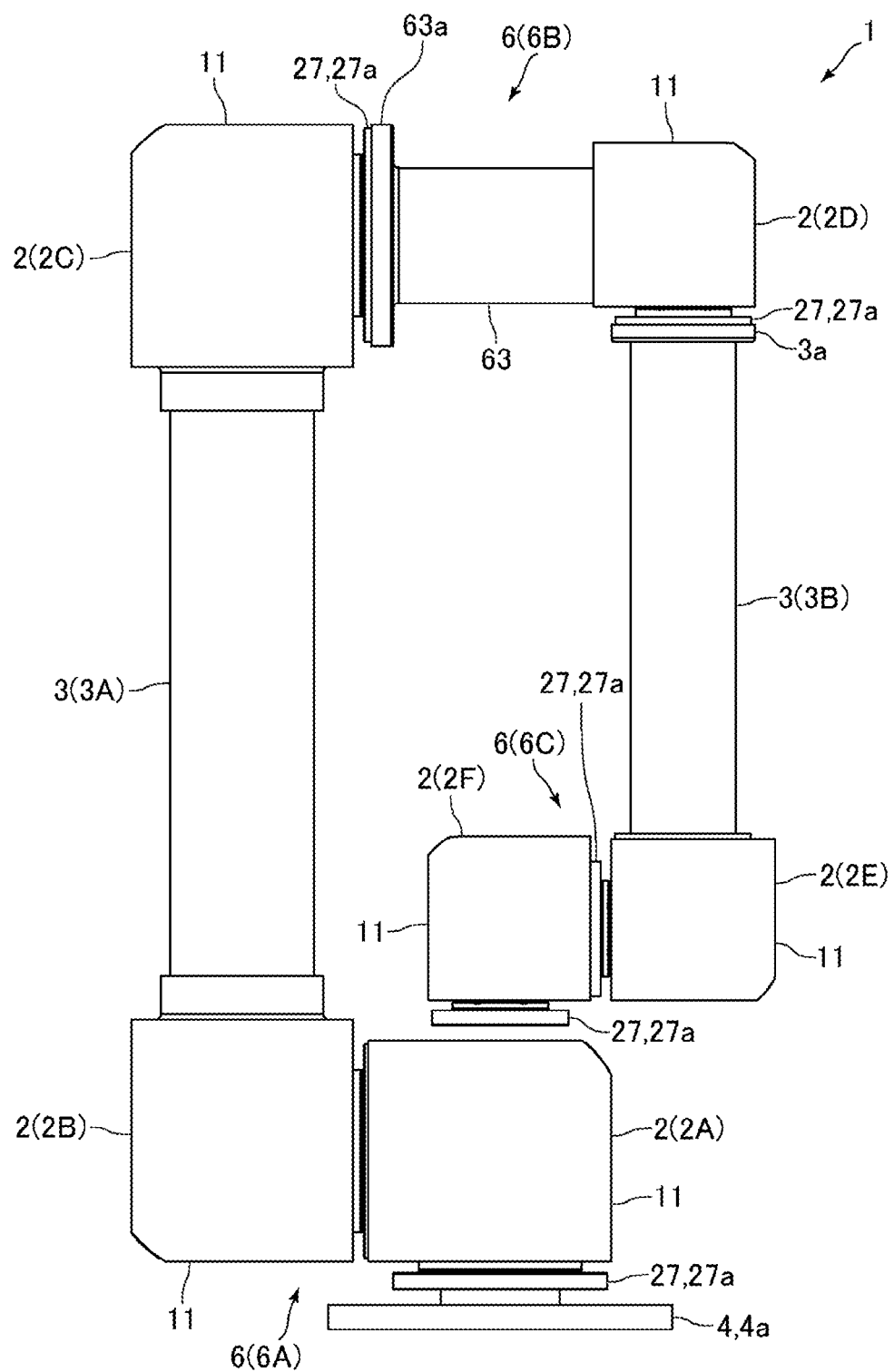
FIG. 7 is a front view of an industrial robot according to another embodiment of the present invention.
Figure 8:
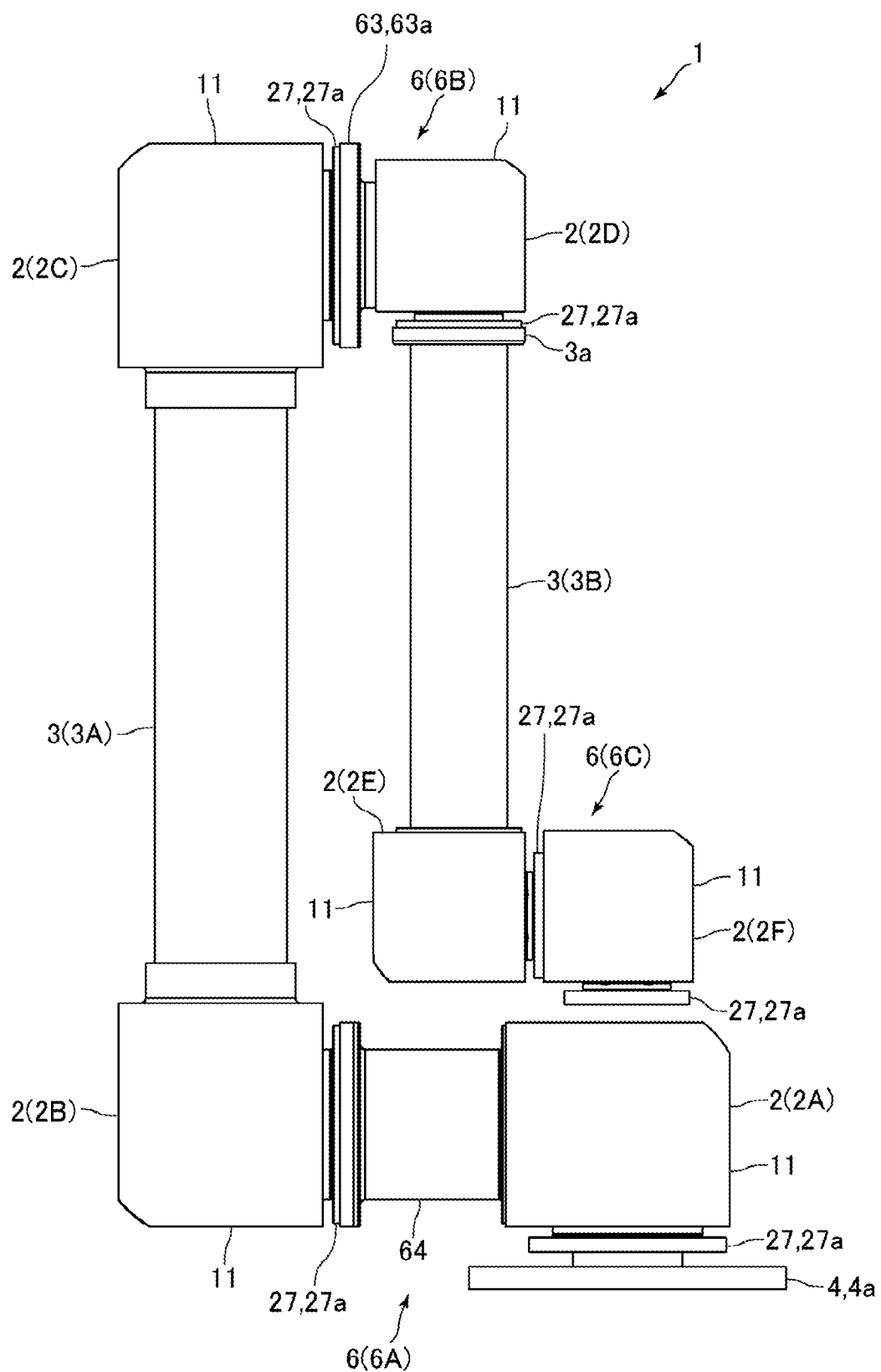
FIG. 8 is a front view of an industrial robot according to another embodiment of the present invention.

Also, for example, as illustrated in FIGS. 7 and 8, in the front face-to-front face posture of the robot 1, the axial center of the rigid internal gear 16 in the first joint part 2A and the axial center of the rigid internal gear 16 in the sixth joint part 2F may be disposed on the same straight line. In this case, for example, as illustrated in FIG. 7, a thickness in the axial direction of the third joint part 2C is thicker (a length thereof is longer) than that of the coupling member 63 described above, but the attachment face 41b of the case 11 in the fourth joint part 2D and the flange part 27a in the third joint part 2C are fixed together via the coupling member 63. Alternatively, as illustrated in FIG. 8, the attachment face 41b of the case 11 in the first joint part 2A and the flange part 27a in the second joint part 2B may be fixed together via a coupling member 64 serving as a first coupling member having a predetermined thickness (length) in the axial direction of the second joint part 2B.

In the above-described embodiment, the first arm 3A and the third joint part 2C are coupled so that the longitudinal direction of the first arm 3A and the axial direction of the third joint part 2C are orthogonal to each other, and the tip of the first arm 3A is fixed to the case 11 in the third joint part 2C. Furthermore, the fourth joint part 2D and the second arm 3B are coupled so that the axial direction of the fourth joint part 2D and the longitudinal direction of the second arm 3B coincide with each other, and the base end of the second arm 3B is fixed to the flange part 27a in the fourth joint part 2D. In addition, for example, as illustrated in FIG. 6, the first arm 3A and the third joint part 2C may be coupled so that the longitudinal direction of the first arm 3A and the axial direction of the third joint part 2C coincide with each other, and the fourth joint part 2D and the second arm 3B may be coupled so that the axial direction of the fourth joint part 2D and the longitudinal direction of the second arm 3B are orthogonal to each other. In this case, the tip of the first arm 3A is fixed to the flange part 27a in the third joint part 2C, the attachment face 41b of the case 11 in the third joint part 2C and the flange part 27a in the fourth joint part 2D are fixed together, and the base end of the second arm 3B is fixed to the case 11 in the fourth joint part 2D. Furthermore, in this case, the third joint part 2C is one joint part and the fourth joint part 2D is the other joint part.

Also, although the attachment face 41b of the case 11 in the first joint part 2A and the flange part 27a in the second joint part 2B are fixed together and the base end of the first arm 3A is fixed to the case 11 in the second joint part 2B in the above-described embodiment, the flange part 27a in the first joint part 2A and the attachment face 41b of the case 11 in the second joint part 2B may be fixed together and the base end of the first arm 3A may be fixed to the flange part 27a in the second joint part 2B. In this case, the second joint part 2B is one joint part and the first joint part 2A is the other joint part.

Although the tip of the second arm 3B is fixed to the case 11 in the fifth joint part 2E and the attachment face 41b of the case 11 in the sixth joint part 2F and the flange part 27a in the fifth joint part 2E are fixed together in the above-described embodiment, the tip of the second arm 3B may be fixed to the flange part 27a in the fifth joint part 2E and the attachment face 41b of the case 11 in the fifth joint part 2E and the flange part 27a in the sixth joint part 2F may be fixed together. In this case, the fifth joint part 2E is one joint part and the sixth joint part 2F is the other joint part.

Although the attachment face 41b of the case 11 in the first joint part 2A and the flange part 27a in the second joint part 2B are fixed together in the above-described embodiment, the attachment face 41b in the first joint part 2A and the flange part 27a in the second joint part 2B may be fixed together via the coupling member 64 as described above (refer to FIG. 8). Likewise, although the attachment face 41b of the case 11 in the sixth joint part 2F and the flange part 27a in the fifth joint part 2E are directly fixed together in the above-described embodiment, the attachment face 41b in the sixth joint part 2F and the flange part 27a in the fifth joint part 2E may be fixed together via a third coupling member having a predetermined thickness in the axial direction of the fifth joint part 2E. Furthermore, although the attachment face 41b of the case 11 in the fourth joint part 2D and the flange part 27a in the third joint part 2C are fixed together via the coupling member 63 in the above-described embodiment, the attachment face 41b in the fourth joint part 2D and the flange part 27a in the third joint part 2C may be directly fixed together.

Although the third joint part 2C has the same structure as the first joint part 2A and the second joint part 2B in the above-described embodiment, the third joint part 2C may have the same structure as the fifth joint part 2E and the sixth joint part 2F. Furthermore, although the fourth joint part 2D has the same structure as the fifth joint part 2E and the sixth joint part 2F in the above-described embodiment, the fourth joint part 2D may have the same structure as the first joint part 2A and the second joint part 2B. The third joint part 2C and the fourth joint part 2D may have the same structure and the third joint part 2C and the fourth joint part 2D may be smaller than the first joint part 2A and the second joint part 2B and may be larger than the fifth joint part 2E and the sixth joint part 2F. A size of the first joint part 2A and a size of the second joint part 2B may differ, a size of the fifth joint part 2E and a size of the sixth joint part 2F may differ, and all of the six joint parts 2 may have the same size.

Although the rigid internal gear 16 is the output shaft of the reduction gear 8 in the above-described embodiment, the flexible external gear 17 may be the output shaft of the reduction gear 8. In this case, the rigid internal gear 16 is fixed to the case 11 and the inner ring 19a of the cross roller bearing 19 and the flexible external gear 17 is fixed to the outer ring 19b of the cross roller bearing 19 and the flange part 27a of the output-side member 27. Furthermore, although the robot 1 includes the three biaxial joint units 6 in the above-described embodiment, the number of biaxial joint units 6 included in the robot 1 may be 2 and 4 or more. In this case, the robot 1 includes the number of arms 3 according to the number of biaxial joint units 6. Moreover, although the robot 1 is the industrial robot in the above-described embodiment, the robot 1 can be applied to various applications. For example, the robot 1 may be a service robot.

The invention claimed is:
1. A robot comprising a plurality of biaxial joint units constituted of two joint parts and a longitudinal-shaped arm configured to couple two of the biaxial joint units, wherein each of the joint parts includes a motor, a reduction gear coupled to the motor, an output-side member fixed to an output shaft of the reduction gear, and a case having the motor and the reduction gear housed therein,
the motor and the reduction gear are fixed to the case,
a rotating shaft of the motor and an input shaft and the output shaft of the reduction gear are disposed coaxially,
wherein the motor includes a rotation shaft in a cylindrical shape, a driving magnet in a cylindrical shape and fixed to an outer circumferential surface of the rotation shaft, and a stator disposed on an outer circumferential side of the driving magnet,
wherein an outer circumferential surface of the stator is fixed to the case,
wherein an end side part of the input shaft of the reduction gear is inserted into and fixed to an inner circumferential side of a part of the rotation shaft where the driving magnet is fixed thereto, and a bonding layer is disposed between the input shaft and the rotation shaft to fix the input shaft to the rotation shaft,
an opening which opens in a direction orthogonal to an axial direction of the output shaft is formed in the case and a planar attachment face orthogonal to an opening direction of the opening is formed in the opening, the output-side member includes a flange part which is formed in an annular shape and is disposed on an outer side of the case, one of the two joint parts constituting the biaxial joint units is set to one joint part and the other thereof is set to the other joint part, the attachment face in the one joint part and the flange part in the other joint part are fixed together either directly or via a coupling member having a predetermined thickness in an axial direction of the output shaft in the other joint part so that an axial direction of the output shaft in the one joint part and the axial direction of the output shaft in the other joint part are orthogonal to each other, and the arm is attached to the other joint part so that a longitudinal direction of the arm and the axial direction of the output shaft in the other joint part are orthogonal to each other.

2. The robot according to claim 1, comprising:

a support member configured to form a base end portion of the robot;

a first arm and a second arm as the arm; and a base-end-side biaxial joint unit disposed between the support member and the first arm, an intermediate biaxial joint unit disposed between the first arm and the second arm, and a tip-side biaxial joint unit attached to a tip of the second arm as the biaxial joint units, wherein, in the tip-side biaxial joint unit, the tip of the second arm is fixed to the case in the other joint part and an end effector is able to be attached to the flange part in the other joint part.

3. The robot according to claim 2, wherein the output-side member of the one joint part in the base-end-side biaxial joint unit is fixed to the support member, a base end of the first arm is fixed to the case of the other joint part in the base-end-side biaxial joint unit, a tip of the first arm is fixed to the case in the other joint part of the intermediate biaxial joint unit, and a base end of the second arm is fixed to the flange part in the one joint part of the intermediate biaxial joint unit, the base-end-side biaxial joint unit using the axial direction of the output shaft of the one joint part in the base-end-side biaxial joint unit as an axial direction of rotation is rotatable relative to the support member, the second arm is rotatable using the axial direction of the output shaft of the other joint part in the intermediate biaxial joint unit as an axial direction of rotation with respect to the first arm on a plane including an axial center of the output shaft of the one joint part in the base-end-side biaxial joint unit, and the second arm using the longitudinal direction of the second arm as an axial direction of rotation is rotatable relative to the intermediate biaxial joint unit.

4. The robot according to claim 3, wherein the second arm is shorter than the first arm to prevent the one joint part in the base-end-side biaxial joint unit and the other joint part in the tip-side biaxial joint unit from interfering with each other.

5. The robot according to claim 2, wherein at least one of the base-end-side biaxial joint unit, the intermediate biaxial joint unit, and the tip-side biaxial joint unit includes the coupling member so that the axial center of the output shaft of the one joint part in the base-end-side biaxial joint unit and the axial center of the output shaft of the one joint part in the tip-side biaxial joint unit are disposed on the same straight line in a front face-to-front face posture in which the axial centers of the output shafts of the joint parts in all of the biaxial joint units are disposed on the same plane and the base-end-side biaxial joint unit and the tip-side biaxial joint unit are closest to each other.

6. The robot according to claim 5, wherein reduction ratios of all of the reduction gears included in all of the joint parts are equal to each other.

7. A robot comprising a first joint part, a second joint part, a third joint part, a fourth joint part, a fifth joint part, a sixth joint part, a longitudinal-shaped first arm, and a longitudinal-shaped second arm, comprising:

a support member configured to form a base end portion of the robot, wherein each of the first joint part, the second joint part, the third joint part, the fourth joint part, the fifth joint part, and the sixth joint part includes a motor, a reduction gear coupled to the motor, an output-side member fixed to an output shaft of the reduction gear, and a case having the motor and the reduction gear housed therein, the motor and the reduction gear are fixed to the case, a rotating shaft of the motor and an input shaft and the output shaft of the reduction gear are disposed coaxially, wherein the motor includes a rotation shaft in a cylindrical shape, a driving magnet in a cylindrical shape and fixed to an outer circumferential surface of the rotation shaft, and a stator disposed on an outer circumferential side of the driving magnet, wherein an outer circumferential surface of the stator is fixed to the case, wherein an end side part of the input shaft of the reduction gear is inserted into and fixed to an inner circumferential side of a part of the rotation shaft where the driving magnet is fixed thereto, and a bonding layer is disposed between the input shaft and the rotation shaft to fix the input shaft to the rotation shaft, an opening which opens in a direction orthogonal to an axial direction of the output shaft is formed in the case and a planar attachment face orthogonal to an opening direction of the opening is formed in the opening, the output-side member includes the flange part formed in an annular shape and disposed on an outer side of the case, a base-end-side biaxial joint unit is formed by fixing the attachment face in the first joint part to the flange part in the second joint part either directly or via a first coupling member having a predetermined thickness in the axial direction of the output shaft in the second joint part so that an axial direction of the output shaft in the first joint part and an axial direction of the output shaft in the second joint part are orthogonal to each other, an intermediate biaxial joint unit is formed by fixing the attachment face in the fourth joint part to the flange part in the third joint part either directly or via a second coupling member having a predetermined thickness in the axial direction of the output shaft in the third joint part so that an axial direction of the output shaft in the third joint part and an axial direction of the output shaft in the fourth joint part are orthogonal to each other, a tip-side biaxial joint unit is formed by fixing the attachment face in the sixth joint part to the flange part in the fifth joint part either directly or via a third coupling member having a predetermined thickness in the axial direction of the output shaft in the fifth joint part so that an axial direction of the output shaft in the fifth joint part and an axial direction of the output shaft in the sixth joint part are orthogonal to each other, the output-side member in the first joint part is fixed to the support member, the base-end-side biaxial joint unit and the first arm are coupled so that the axial direction of the output shaft in the second joint part and a longitudinal direction of the first arm are orthogonal to each other and a base end of the first arm is fixed to the case in the second joint part, the first arm and the intermediate biaxial joint unit are coupled so that the longitudinal direction of the first arm and the axial direction of the output shaft in the third joint part are orthogonal to each other and a tip of the first arm is fixed to the case in the third joint part, the intermediate biaxial joint unit and the second arm are coupled so that the axial direction of the output shaft in the fourth joint part and a longitudinal direction of the second arm coincide with each other and a base end of the second arm is fixed to the output-side member in the fourth joint part, the second arm and the tip-side biaxial joint unit are coupled so that the longitudinal direction of the second arm and the axial direction of the output shaft in the fifth joint part are orthogonal to each other and a tip of the second arm is fixed to the case in the fifth joint part, and an end effector is able to be attached to the output-side member in the sixth joint part.

8. The robot according to claim 7, wherein the second arm is rotatable using the axial direction of the output shaft in the third joint part as an axial direction of rotation relative to the first arm on a plane including the axial center of the output shaft in the first joint part.

9. The robot according to claim 8, wherein the second arm is shorter than the first arm to prevent the first joint part and the fifth joint part from interfering with each other.

10. The robot according to claim 9, wherein the first joint part and the second joint part have the same structure, the fifth joint part and the sixth joint part have the same structure, and the fifth joint part and the sixth joint part are smaller than the first joint part and the second joint part.

11. The robot according to claim 10, wherein the third joint part has the same structure as the first joint part and the second joint part, the fourth joint part has the same structure as the fifth joint part and the sixth joint part, the first arm and the second arm are formed in a cylindrical shape, and an outer diameter of the second arm is smaller than an outer diameter of the first arm.

12. The robot according to claim 7, comprising at least one of the first coupling member and the second coupling member, and the axial center of the output shaft in the first joint part and the axial center of the output shaft in the sixth joint part are disposed on the same straight line in a front face-to-front face posture in which an axial center of the output shaft in the first joint part, an axial center of the output shaft in the second joint part, an axial center of the output shaft in the third joint part, an axial center of the output shaft in the fourth joint part, an axial center of the output shaft in the fifth joint part, and an axial center of the output shaft in the sixth joint part are disposed on the same plane and the base-end-side biaxial joint unit and the tip-side biaxial joint unit are closest to each other.

13. The robot according to claim 4, wherein reduction ratios of all of the reduction gears included in all of the joint parts are equal to each other.

14. The robot according to claim 3, wherein reduction ratios of all of the reduction gears included in all of the joint parts are equal to each other.

15. The robot according to claim 2, wherein reduction ratios of all of the reduction gears included in all of the joint parts are equal to each other.

16. The robot according to claim 1, wherein reduction ratios of all of the reduction gears included in all of the joint parts are equal to each other.

17. The robot according to claim 8, wherein the first joint part and the second joint part have the same structure, the fifth joint part and the sixth joint part have the same structure, and the fifth joint part and the sixth joint part are smaller than the first joint part and the second joint part.

18. The robot according to claim 17, wherein the third joint part has the same structure as the first joint part and the second joint part, the fourth joint part has the same structure as the fifth joint part and the sixth joint part, the first arm and the second arm are formed in a cylindrical shape, and an outer diameter of the second arm is smaller than an outer diameter of the first arm.

19. The robot according to claim 7, wherein the first joint part and the second joint part have the same structure, the fifth joint part and the sixth joint part have the same structure, and the fifth joint part and the sixth joint part are smaller than the first joint part and the second joint part.

20. The robot according to claim 19, wherein the third joint part has the same structure as the first joint part and the second joint part, the fourth joint part has the same structure as the fifth joint part and the sixth joint part, the first arm and the second arm are formed in a cylindrical shape, and an outer diameter of the second arm is smaller than an outer diameter of the first arm.

* * * * *